United States Patent Office 3,595,923
Patented July 27, 1971

3,595,923
**CONDENSATION PRODUCT OF 2-ETHYLHEXA-
NOL A POLYETHYLENE GLYCOL MONO-N-
BUTYL ETHER AND THIODIGLYCOL**
Hans-George Schmelzer, Cologne-Stammheim, Willi
Wolff, Cologne-Muelheim, and Hans Holtschmidt,
Horst Kopnick, and Eberhart Degener, Leverkusen,
Germany, assignors to Farbenfabriken Bayer Aktien-
gesellschaft, Leverkusen, Germany
No Drawing. Filed June 17, 1968, Ser. No. 737,280
Claims priority, application Germany, June 30, 1967,
F 52,829
Int. Cl. C07c *149/14;* C08d *11/02;* C08f *45/46*
U.S. Cl. 260—609                                    4 Claims

ABSTRACT OF THE DISCLOSURE

Plasticizer for elastomers comprising the condensation product of 2-ethylhexanol, a polyethylene glycol mono-n-butyl ether with an average molecular weight of from 200–400 and thiodiglycol in a molar ratio of 0.8–2:0.05–0.2:1 respectively.

---

This invention relates to a plasticising agent.

French Patent specification No. 1,285,749 describes the use of polyether thioethers as plasticisers for elastomers and thermoplasts. Preference is given to polyether thioethers of the kind obtained by the condensation of oxyalkylated monoalcohols such as, for example, diethylene glycol mono-n-butylether with thiodiglycol, respectively, di-(2-hydroxyethyl)-sulphides, in the presence of acid etherification catalysts.

We have now found that polyether polythioethers obtained by condensing 2-ethyl hexanol, a polyethylene glycol mono-n-butyl ether with an average molecular weight of from 200 to 400 and thiodiglycol in a molar ratio of 0.8–2:0.05–0.2:1 are particularly suitable for use as plasticisers for elastomers.

The plasticisers used in accordance with the invention have particularly good properties in cases where the reaction components are condensed in the presence as acid etherification catalysts of acid compounds of trivalent phosphorus, preferably with phosphorous acid in quantities of from 0.1 to 2% by weight and preferably in quantities of from 0.5 to 1% by weight, at a temperature in the range of from 140 to 220° C.

The polyethylene glycol mono-n-butylethers with an average molecular weight of from 200 to 400 which are used in the preparation of the plasticisers according to the invention are obtained in known manner by the addition of an appropriate quantity of ethylene oxide to n-butanol. By the way of their production these products are mixtures. They may be used as such with the original molecular weight distribution or, alternatively, they may be adjusted to the required average molecular weight by the removal through distillation of the low molecular weight components.

In addition to phosphorous acid itself which is preferably used, its acid salts, halides, mono-, di- and triesters and its amides and ester amides may also be used as the acid compounds of trivalent phosphorus which are employed as the etherification catalysts. The following compounds are mentioned by way of example: ammonium hydrogen phosphite, phosphorus trichloride, phosphorous acid monomethyl ester, phosphorous acid monoethyl ester, phosphorous acid monoisopropyl ester, phosphorous acid dimethyl ester, phosphorous acid diethyl ester, phosphorous acid diphenyl ester, phosphorous acid triethyl ester, phosphorous acid triphenyl ester, phosphorous acid diethyl ester chloride, phosphorous acid bis-(dimethyl amide), phosphorous acid tris-(dimethyl amide), phosphorous acid bis-(dimethyl amide) chloride, phosphorous acid ethyl ester dimethyl amide chloride.

The plasticisers according to the invention are composed of units with different molecular weight. However, the average molecular weight of the condensation products does not differ very much within the limits of the specified molar ratios of 2-ethyl hexanol, polyethylene glycol mono-n-butyl ether and thiodiglycol. The molecular weight of the products according to the invention is not affected to any appreciable extent by the relatively small component of polyethylene glycol mono-n-butyl ether. The component which is known to have the most significant bearing on condensation is thiodiglycol. Whereas 2-ethyl hexanol and polyethylene glycol mono-n-butyl ether are almost impossible to etherify under the reaction conditions, thiodiglycol condenses with these components and with itself. Accordingly, molecules containing two and more thiodiglycol units are formed. Some of the 2-ethyl hexanol is not incorporated under the condensation conditions by the self-condensation of the thiodiglycol and is distilled off during condensation. Although the amount of 2-ethyl-hexanol incorporated by condensation increases as the quantity of 2-ethyl hexanol increases within the range of the molar ratios specified, it is not increased in the same measure in which 2-ethyl hexanol is used for condensation; in other words, the excess of 2-ethylhexanol increases more quickly than the portion of 2-ethylhexanol incorporated by condensation. However, this excess is required within the range of the molar ratios specified for the reproducible production of the plasticisers according to the invention with optimum technological properties. If, for example, 1.2 to 1.8 mols of 2-ethylhexanol are used per mol of thiodiglycol and 0.1 mol of polyethylene glycol mono-n-butyl ether, as is preferably the case, physically very similar materials containing 0.7 to 1 mol of 2-ethylhexanol per mol of thiodiglycol incorporated by condensation are obtained.

The plasticisers according to the invention are prepared in the conventional way by heating the mixture of 2-ethylhexanol, polyethylene glycol mono-n-butyl ether and thiodiglycol and the presence of the aforementioned acid compounds of trivalent phosphorus to a temperature in the range of from 140 to 220° C., and simultaneously distilling off the water formed and any excess 2-ethylhexanol initially at normal pressure and then in vacuo until the reaction product contains hardly any hydroxyl groups. It has proved to be of advantage to heat the mixture at the beginning for a while under reflux and then to continue the condensation by distilling off the water and the excess 2-ethylhexanol in the described manner. The acid etherification catalyst is then neutralised with the stoichiometric quantity of a base, preferably with alkali metal hydroxides or alkali metal carbonates. In order to complete neutralisation and to eliminate any odour given off, the reaction product may be briefly treated with steam, after which it is dried and the salts precipitated are filtered off. The products thus obtained are in the form of pale yellow, practically odourless oils.

The plasticisers thus prepared are eminently suitable for plasticising synthetic elastomers and natural rubber. Compared with conventional plasticisers, they represent outstanding multi-purpose products which, by virtue of their better compatibility with the elastomers, may be used more widely than conventional systems. In addition, the products according to the invention provide the vulcanisates with better low temperature behaviour than the conventional plasticisers.

At the same time, they impart to the vulcanisates the same high level of resistance to heat as the chemically similar products, accompanied by comparably good low volatility, a high swelling capacity and a comparable increase in elasticity.

The plasticisers according to the invention are particularly suitable for elasticising synthetic elastomers such as, for example, polychloroprene, acrylonitrile/butadiene copolymers, styrene/butadiene compolymers, polybutadiene, poly-cis-1,4-butadiene, polycis-1,4-isoprene and isoprene/isobutylene copolymers. They are blended with the elastomer in the usual way either on mixing mills or in internal mixers in quantities of from 1 to 50 parts by weight per 100 parts by weight of the elastomer. All the additives normally used in the rubber industry such as, for example, fillers, vulcanising agents, antioxidants and accelerators, may of course be added to the compounds containing plasticisers according to the invention. The crude compounds are effectively plasticised by the plasticisers according to the invention and show practically no scorching. They may be vulcanised in the usual way, for example by heating accompanied by shaping or, after shaping, by heating under pressure and in the form of calendered sheets.

The plasticisers according to the invention and the polyether thioethers of French patent specification No. 1,285,749 have substantially the same volatility. The condensation products of non-oxyalkylated monohydric alcohols show a higher level of volatility. As far as application is concerned, however, the volatility of the plasticizers as such is not as important as their compatibility with the elastomers.

The polyether thioethers of oxyalkylated monoalcohols and di-(2-hydroxy ethyl)-sulphides which are described in French patent specification No. 1,285,749 are not compatible enough in a number of technologically important types of synthetic rubber. In the case of polychloroprene vulcanisates for example, containing only an average amount of 20 parts by weight of this plasticiser per 100 parts of elastomer, the plasticiser is exuded in considerable quantities after only a short time when the vulcanisates are heated to 140° C. By contrast, the condensation products of monohydric alcohols and thiodiglycol which as such are more volatile are compatible in chloroprene rubber vulcanisates at temperatures around 140° C., even when they are present in quantities larger than 20 parts by weight per 100 parts by weight of elastomer. However, these products are only compatible to a certain extent in polar synthetic rubbers, depending partly upon their filler content. In the case of an acrylonitrile/butadiene copolymer, for example, containing 50 parts by weight of carbon black per 100 parts by weight of copolymer, these condensation products are deprived of their compatibility when present in quantities of more than 20 parts by weight per 100 parts by weight of copolymer, and exude out of the vulcanisates at temperatures as low as room temperature.

Originally, it appeared obvious to produce a universally compatible system by mixing the polyether thioethers described in the French patent specification and the condensation products of monohydric alcohols and thiodiglycol obtainable in accordance with U.S. Pat. No. 2,582,605. In order, however, to improve the compatibility of the condensation products obtainable in accordance with U.S. Pat. No. 2,582,605 in acrylonitrile/butadiene copolymers, for example, such large quantities of the polyether thioethers described in French patent specification No. 1,285,749 are required these mixtures exude out of chloroprene rubber vulcanisates, for example.

By contrast, the plasticisers according to the invention are highly compatible both with polar and with non-polar elastomers. This fact is surprising insofar as these condensation products of 2-ethylhexanol, thiodiglycol and polyethylene glycol mono-n-butylether contain a disproportionately small number of polyethylene glycol mono-n-butylether units in comparison with the mixtures. It may, therefore, be assumed that the major part of this component etherifying more quickly with the thiodiglycol than 2-ethylhexanol yields mainly asymmetrical molecules of the formula:

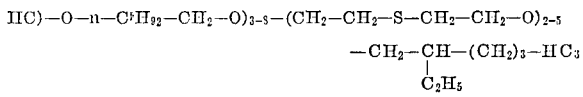

$$-CH_2-CH-(CH_2)_3-HC_3$$
$$|$$
$$C_2H_5$$

which are responsible for the universal properties of the plasticisers according to the invention.

The low temperature behaviour of the vulcanisates is further improved by the plasticisers according to the invention in relation to conventional plasticisers.

By virtue of the use as etherification catalysts of acid compounds of trivalent phosphorus, preferably phosphorous acid, the plasticisers according to the invention are satisfactory as regards both colour and odour so that they are also eminently suitable for the production of light-coloured vulcanisates. Compared with the colour values of from 2 to 15 of the products according to the invention, the polyether thioethers according to French Pat. No. 1,285,749 which are preferably produced with phosphoric acid have colour values of from 60 to 80 and accordingly are less suitable for the production of light-coloured compounds. The condensates according to U.S. Pat. No. 2,582,605 that are preferably prepared with p-toluene sulphonic acid are black-brown in colour and are completely unsuitable for light-coloured compounds.

The acid compounds of trivalent phosphorus catalyst the linear etherification of the thiodiglycol in an extremely specific manner so that hardly any odorous, cyclic secondary products are formed during the condensation reaction. With phosphoric acid as a catalyst, the quantities of cyclic secondary products are considerably larger and, with p-toluene sulphonic acid as a catalyst, the thiodiglycol is cyclised to thioxane and dithiane to such an extent that the yields of condensation product fall very considerably. In addition, difficulties are involved in removing the odorous cyclic secondary products so that these condensation products suffer from offensive odour.

The reducing effect of the acid compounds of trivalent phosphorus even improves starting materials that are not satisfactory in regard to colour during condensation. The condensates are altogether lighter in colour than the starting materials.

A comparable improvement in regard to colour and odour can also be obtained in the plasticisers according to French Patent specification No. 1,285,749 and in the condensation products of U.S. Pat. No. 2,582,605 by using the acid compounds of trivalent phosphorus. Comparison shows, however, that the products obtained do not have the optimum technological properties of the plasticisers according to the invention.

EXAMPLES

The following plasticisers are used in the comparison examples that are set out in the following to illustrate the application:

Plasticiser A: (plasticiser according to the invention)

1.95 kg. (15 mols) of 2-ethyl hexanol, 1.22 kg. (10 mols) of thiodiglycol, 0.25 kg. of polyethylene glycol mono-n-butyl ether with an average molecular weight of 250 and 25.7 g. of phosphorous acid are initially heated under reflux for 8 hours.

This is followed by 30 hours condensation at normal pressure/180-190° C., 250-300 g. of water and 200-300 g. of 2-ethyl hexanol distil over. Condensation is then continued for 40 hours in vacuo at 15 torr. During the first 8 hours, the temperature is slowly increased from 100 to 190-200° C., and is kept at this level until condensation is at an end. Most of the unreacted 2-ethyl hexanol is distilled off during the first 8 hours. A total of 650-750 g. of 2-ethylhexanol is recovered during condensation in vacuo. The condensation product is cooled to 80-90° C. and is neutralised by the addition of a solution of 12.6 g. of sodium hydroxide in 100 g. of water. Steam is then blown in over a period of 4 hours at 120–130° C., followed finally by 4 hours dyring in vacuo (10–15 torr) at 130° C. The salts which are precipitated in a readily filtered form are filtered off after cooling. The filtrate is in the form of a pale yellow, mobile liquid oil whose OH-number is less than 10. The yield is 2.1 kg.

Plasticiser B: Condensation product of thiodiglycol and 2-ethylhexanol without any polyethylene glycol mono-n-butyl ether with phosphorous acid as a catalyst.

2.08 kg. (16 mols) of 2-ethylhexanol, 1.22 kg. (10 mols) of thiodiglycol and 24.8 g. of phosphorous acid are condensed as in case (A) above initially under reflux and then under normal conditions. 250–300 g. of water and 350–450 g. of 2-ethylhexanol distil over. Condensation is then continued in vacuo under the conditions described at (A) above, another 450–550 g. of 2-ethylhexanol distilling off. In order to neutralise the phosphorous acid, 12.1 g. of sodium hydroxide in 100 g. of water are added. The product is then worked up by the method described in part (A) above. The OH-number of the pale yellow, mobile liquid condensation product is below 10.

(Yield: an average of 2 kg.)

Plasticiser C

Condensation product of thiodiglycol and diethylene glycol mono-n-butyl ether according to Example 1 of French Patent specification No. 1,285,749.

Plasticiser D

A mixture consisting of 85 parts by weight of Plasticiser B and 15 parts by weight of Plasticiser C.

EXAMPLE 1

Compounds are prepared from the following ingredients on mixing mills with an initial roll surface temperature of 40° C.: 100.0 parts by weight of natural rubber, 10.0 parts by weight of reinforcing furnace black, 40.0 parts by weight of semi-reinforcing furnace black, 20.0 parts by weight of plasticiser, 0.5 part by weight of stearic acid, 1.0 part by weight of phenyl-α-naphthylamine.

The following vulcanisation system is then incorporated: 5.0 parts by weight of zinc oxide, 2.5 parts by weight of sulphur, 0.5 part by weight of dibenzothiazyldisulphide, 0.2 part by weight of diphenylguanidine.

The compounds are vulcanised in a press for 30 minutes at 151° C. The vulcanised sheets prepared in this way are stored for 24 hours at the following temperatures:
Room temperature: 70° C., 100° C., 140° C.

The exuding of the plasticisers is then assessed. The results are as follows:

TABLE 1

|  | RT | 70° C. | 100° C. | 140° C. |
|---|---|---|---|---|
| Plasticizer: |  |  |  |  |
| A | − | − | − | − |
| B | − | + + | − | − |
| C | + + | + + | + | + |

In this table and the corresponding tables of the following examples, the symbols have the following means:
− = no exuding
+ = slight exuding
+ + = pronounced exuding.

EXAMPLE 2

Compounds are prepared from the following ingredients on mixing mills with an initial roll surface temperature of 40° C.; 100.0 parts by weight of styrene/butadiene rubber containing 28% styrene, 10.0 parts by weight of reinforcing furnace black, 40.0 parts by weight of semi-reinforcing furnace black, 20.0 parts by weight of plasticiser, 0.5 part by weight of stearic acid, 1.0 part by weight of phenyl-α-naphthylamine.

The following vulcanisation system is then incorporated: 5.0 parts by weight of zinc oxide, 1.8 parts by weight of sulphur, 1.0 part by weight of N-diethyl-2-benzothiazyl sulphenamide.

The compounds are vulcanised in a press for 30 minutes at 151° C. The vulcanised sheets obtained in this way are stored for 24 hours at the following temperatures:
Room temperature: 70° C., 100° C., 140° C.

The exuding of the plasticisers is then assessed. The results are as follows:

TABLE 2

|  | RT | 70° C. | 100° C. | 140° C. |
|---|---|---|---|---|
| Plasticiser: |  |  |  |  |
| A | − | − | − | − |
| B | − | − | − | − |
| C | + + | + + | + + | + |

EXAMPLE 3

Compounds are prepared from the following ingredients on mixing mill with an initial roll surface temperature of 40° C.: 100.0 parts by weight of acrylonitrile/butadiene rubber containing 33% of acrylonitrile, 10.0 parts by weight of reinforcing furnace black, 40.0 parts by weight of semi-reinforcing furnace black, 20.0 parts by weight of plasticiser, 0.5 part by weight of stearic acid, 1.0 part by weight of phenyl-α-naphthylamine.

The following vulcanisation system is then incorporated: 5.0 parts by weight of zinc oxide, 1.8 parts by weight of sulphur, 1.0 part by weight of N-diethyl-2-benzothiazyl sulphenamide.

The compounds are vulcanised in a press for 30 minutes at 151° C. The vulcanised sheets prepared in this way are stored for 24 hours at the following temperatures:
Room temperature: 70° C., 100° C., 140° C.

The exuding of the plasticisers is then assessed. The results are as follows:

TABLE 3

|  | RT | 70° C. | 100° C. | 140° C. |
|---|---|---|---|---|
| Plasticiser: |  |  |  |  |
| A | − | − | − | − |
| B | + + | + | + | − |
| C | − | − | − | − |

EXAMPLE 4

Compounds are prepared from the following ingredients on mixing mill with an initial roll surface temperature of 40° C.: 100.0 parts by weight of chloroprene rubber, 10.0 parts by weight of reinforcing furnace black, 40.0 parts by weight of semi-reinforcing furnace black, 20.0 parts by weight of plasticiser, 0.5 part by weight of stearic acid, 1.0 part by weight of phenyl-α-naphthylamine.

The following vulcanisation system is then incorporated: 4.0 parts by weight of magnesium oxide, 5.0 parts by weight of zinc oxide, 0.5 part by weight of ethylene thiourea.

The compounds are vulcanised in a press for 30 minutes at 151° C. The vulcanised sheets prepared in this way are stored for 24 hours at the following temperatures:
Room temperature: 70° C., 100° C., 140° C.

The exuding of the plasticisers is then assessed. The results are set out in the following table:

TABLE 4

|  | RT | 70° C. | 100° C. | 140° C. |
|---|---|---|---|---|
| Plasticiser: |  |  |  |  |
| A | − | − | − | − |
| B | − | − | − | − |
| C | − | − | + | + + |

EXAMPLE 5

Compounds are prepared and vulcanised as described in Example 3, except that plasticisers A and D are present. The plasticisers are assessed for exuding, the results being set out in the following table:

TABLE 5

| Plasticiser: | RT | 70° C. | 100° C. | 140° C. |
|---|---|---|---|---|
| A | − | − | − | − |
| D | + | + | + | − |

EXAMPLE 6

The compounds prepared in accordance with Example 4 are tested to determined their low temperature behaviour. Their second order transition temperature is determined by Roelig's method (DIN 53 513):

| | Second order transition temperature (° C.) |
|---|---|
| Plasticiser A | −46 |
| Plasticiser B | −46 |
| Plasticiser C | −42 |

Plasticiser E: (Plasticiser according to the invention)

1.69 kg. (13 mols) of 2-ethylhexanol, 1.22 kg. (10 mols) of thiodiglycol, 0.5 kg. of a polyethylene glycol mono-n-butyl ether with an average molecular weight of 250 and 34.1 g. of phosphorous acid are initially condensed at normal pressure at 150–200° C., a mixture of water and 2-ethylhexanol distilling over.

After the final temperature of 200° C. has been reached, condensation is continued at this temperature for a period of 10 hours at normal pressure. A total of 270 g. of water and 300 g. of crude 2-ethylhexanol distil over at normal pressure. The pressure is then gradually reduced at 200° C. until the full water-jet vacuum of 12 to 14 torr has been reached after most of the volatile constituents have been distilled off. This is followed by another 15 hours condensation at 200° C./12–14 torr. A total of 500 g. of distillate distils over in vacuo. This consists mainly of unreacted 2-ethylhexanol just like the oily distillation product from the condensation under normal pressure. The condensate is cooled to 100° C. 16.7 g. of sodium hydroxide in 100 ml. of water are added to neutralise the phosphorous acid. Steam is then blown in for 4 hours, followed finally by 4 hours drying at 150° C. in a water jet vacuum. The salts precipitated on drying are filtered off. The filtrate is a pale yellow liquid with the following properties:

Density: 0.989
pH-value: 6–8
Refractive index $(n_D^{20})$: 1.480
Viscosity at 20° C. approx. 30 cp.
Volatility after 5 hours at 150° C. (tested in a Brabender high-speed water tester): 6%
Setting point: approx. −60° C.
Flash point in an open crucible: approx. 200° C.

The yield is 2,250 g. The product has the same outstanding technological properties as a universally compatible plasticiser for synthetic rubber as Plasticiser A according to the invention.

Plasticiser F (Plasticiser according to the invention)

Following the procedure described in respect of Plasticiser E, a product with the same technological properties as Plasticisers A and E is obtained by condensing 1.82 kg. (14 mols) of 2-ethylhexanol, 1.22 kg. (10 mols) of thiodiglycol and 0.4 kg. of a polyethylene glycol mono-n-butyl ether with an average molecular weight of 400, with 34.4 g. of phosphorous acid.

Plasticiser G (Plasticiser according to the invention)

Following the procedure described in respect of Plasticisers A and E, a plasticiser identical in its technological properties with the products A, E and F according to the invention is obtained from 1.04 kg. (8 mols) of 2-ethylhexanol, 1.22 kg. (10 mols) of thiodiglycol and 0.2 kg. of a polyethylene glycol mono-n-butyl ether with an average molecular weight of 200, condensed with 49.2 g. of phosphorous acid.

What we claim is:

1. A condensation product of 2-ethylhexanol, a polyethylene glycol mono-n-butyl ether with an average molecular weight of from 200–400 and thiodiglycol in a molar ratio of 0.8–2:0.05–0.2:1, respectively, said condensation having been carried out in the presence of an acid etherification catalyst of an acid compound of trivalent phosphorous at a temperature of 140 to 220° C.

2. The plasticiser of claim 1 wherein said etherification catalyst is selected from the group consisting of phosphorous acid, its acid salts, halides, mono-, di- and triesters and its amides and ester amides.

3. The condensation product of claim 1 wherein said etherification catalyst is phosphorous acid.

4. The condensation product of claim 3 wherein said polyethylene glycol mono-n-butyl ether has an average molecular weight of 250.

References Cited

UNITED STATES PATENTS 2,582,605  1/1952  Richter et al. _____ 260—608

FOREIGN PATENTS 1,285,749  1962  France _____ 260—609

CHARLES B. PARKER, Primary Examiner

D. R. PHILLIPS, Assistant Examiner

U.S. Cl. X.R.

260—30.8, 761